United States Patent [19]

Wolf et al.

[11] Patent Number: 4,828,166

[45] Date of Patent: May 9, 1989

[54] DEVICE FOR REGULATING THE HEATING ELEMENT OF A COOKING VESSEL

[75] Inventors: Kurt Wolf; Wolfram Andre, both of Wildbad, Fed. Rep. of Germany

[73] Assignee: Fissler BmbH, Idar-Oberstein, Fed. Rep. of Germany

[21] Appl. No.: 193,336

[22] Filed: May 12, 1988

[30] Foreign Application Priority Data

May 13, 1987 [DE] Fed. Rep. of Germany ....... 3715910

[51] Int. Cl.$^4$ .......................... F23N 1/08; G05D 27/00
[52] U.S. Cl. .................................. 236/20 A; 219/496; 236/92 R; 99/331
[58] Field of Search ................. 236/92 R, 20 A, 20 R; 99/329 R, 328, 331; 219/496, 332

[56] References Cited

U.S. PATENT DOCUMENTS 2,431,801 12/1947 Gibson ............................. 236/92 R
3,350,012 10/1967 Choquette, Jr. et al. ........ 236/92 R Primary Examiner—William E. Wayner

[57] ABSTRACT

A device for regulating the heating element of a cooking vessel of the type with an input device for setting a preselected cooking temperature in the range of the boiling point of water, a device for measuring the temperature on or in the cooking vessel, and a control circuit for maintaining cooking temperature constant at the preselected level. The device includes apparatus for altering the cooking temperature as a function of the measured atmospheric pressure or the altitude above sea level at the site of use of the cooking vessel, such adjustment being in accordance with the dependence of the boiling point of water on atmospheric pressure or altitude above sea level.

11 Claims, 2 Drawing Sheets

DEVICE FOR REGULATING THE HEATING ELEMENT OF A COOKING VESSEL

FIELD OF THE INVENTION

This invention relates to devices for regulating the heating element of cooking vessels in which a boiling or cooking process can be set at a preselected cooking temperature in the range of the boiling point of water by means of an input device and then kept constant at the preselected cooking temperature by means of a control circuit.

BACKGROUND OF THE INVENTION

Various control circuits for accurately regulating boiling or cooking temperature without allowing it to exceed a preselected boiling or cooking temperature are known. Value is often placed on achieving the desired boiling or cooking temperature as rapidly as possible in the warm-up phase and steps are taken to assure that this initial heating phase requires a minimum of energy.

These known control circuits also have enough accuracy in their control so that it is possible to select a cooking temperature near the boiling point of water without significant evolution of steam. However, with such known control circuits, this accuracy cannot always be fully utilized, because the dependence of the boiling point of water on the geographic altitude at the place of use has the effect of interfering, especially with the temperature range near the boiling point of water.

OBJECTS OF THIS INVENTION

The object of this invention is to create a device of the type first described above in which the selected processing or cooking temperature can be near the boiling point of water regardless of the effect thereon of the geographic altitude at the site of use, while preventing any negative effect due to the change in the boiling point of water.

SUMMARY OF THE INVENTION

The problem described above is solved according to this invention by adjusting the preselected processing or cooking temperature as a function of the measured prevailing atmospheric pressure or the given altitude above sea level at the site where the cooking vessel is used in accordance with the dependence of the boiling point of water on atmospheric pressure or altitude above sea level.

The processing or cooking temperature can be preselected and input as with known control circuits. Since atmospheric pressure is determined or the geographic altitude is known, an automatic correction is performed taking into account the change in boiling point of water as a function of these parameters. For example, if the processing or cooking temperature set is 1° C. below the boiling point of water, then such temperature interval will be maintained regardless of the atmospheric pressure or the geographic altitude of the site where it is used.

If 99° C., that is, 1° C. below the boiling point of water at normal sea-level atmospheric pressure, is selected as the processing or cooking temperature, then the boiling point will not be exceeded even if the boiling point of water drops to 93° C. due to the prevailing atmospheric pressure or the given geographic altitude. The preselected processing or cooking temperature is reduced to the extent of the dependence of the boiling point of water on atmospheric pressure and geographic altitude. Thus, if the boiling point of water is 93° C., the processing or cooking temperature would become 92° C., even though 99° C. is the preselected temperature.

The dependence of the boiling point of water can be eliminated in a simple manner by reducing the preselected processing or cooking temperature by 1° C. for a reduction in atmospheric pressure of by about 25 hPa, or by reducing the preselected processing or cooking temperature by 1° C. for an increase in altitude above sea level of about 210 meters.

On a pressure cooker, the display which is marked "vessel under pressure" and "vessel pressureless" can be adjusted in an equivalent manner, according to the same relationship.

According to one version of this invention, a continuous adaptation of the preselected processing or cooking temperature to accommodate the changing boiling point of water is achieved by having a microprocessor in the control circuit of the heating element. Such microprocessor not only receives the actual temperature, as determined by a temperature probe in or on the cooking vessel, and the preselected processing or cooking temperature by means of the input device, but the air pressure is measured by means of a pressure sensor and appropriate measurement signals are supplied to the microprocessor by means of an analog-digital converter. The microprocessor reduces the preselected processing or cooking temperature, adjusting it in accordance with these measurement signals and the predetermined dependence of the boiling point of water on atmospheric pressure.

According to another version, manual adjustment is possible with a microprocessor in the heating element control circuit. As in the automatic version, the actual temperature in or on the cooking vessel is determined and input by means of a temperature probe, and the preselected processing or cooking temperature is input by an input device. Signals corresponding to the altitude above sea level at the site of cooking vessel use can be sent to the microprocessor by a presetting device, and the microprocessor reduces the preselected processing or cooking temperature in accordance with these signals and the given dependence of the boiling point of water on the altitude above sea level.

The presetting device is set only once for the geographic altitude at the site of use of the cooking vessel for each control circuit. This presetting can be performed in a simple manner by including a presetting device with a switch device by means of which a number of different altitude ranges can be input. Such altitude ranges are assigned fixed predetermined temperature reductions from the preselected procession or cooking temperature.

According to one version, the switch device has two two-position switches allowing four altitude levels to be set. Of course, weather-induced changes in atmospheric pressure are not taken into account in this way and must be determined by appropriate input of cooking temperature.

This invention will now be explained in more detail by reference to the practical examples in the drawings.

DETAILED DESCRIPTION OF PREFERRED EMBODIMENTS

FIG. I shows that atmospheric pressure D at sea level is 1013 hPa, which corresponds to 760 mm Hg, at which pressure the boiling point of water is 100° C. With an increase in altitude H, atmospheric pressure D drops such that the boiling point of water also drops as indicated by the points 99° C. to 93° C. as marked on the curve. Thus, by way of example, the boiling point of water at a geographic altitude of 1180 m is only 96° C. and at 1790 m is only 94° C. The boiling point drops 1° C. when the atmospheric pressure D drops by about 25 hPa or about 20 mm Hg.

An accurate determination of atmospheric pressure as a function of geographic altitude is represented by the following equation:

$$P = P_o \cdot e - \frac{h - h_o}{RT}$$

where
$h_o$=sea level (zero altitude)
h=altitude (site of cooking vessel use)
R=29.27 m/K (gas constant of air)
T=air temperature
$P_o$=normal pressure at sea level.

Figure 1:
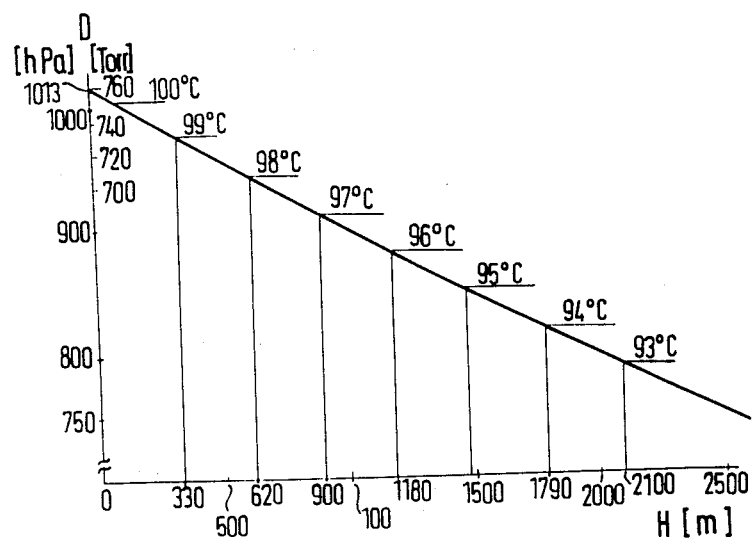
FIG. 1 illustrates how atmospheric pressure D varies as a function of the geographic altitude (altitude above sea level) H.
Figure 2:
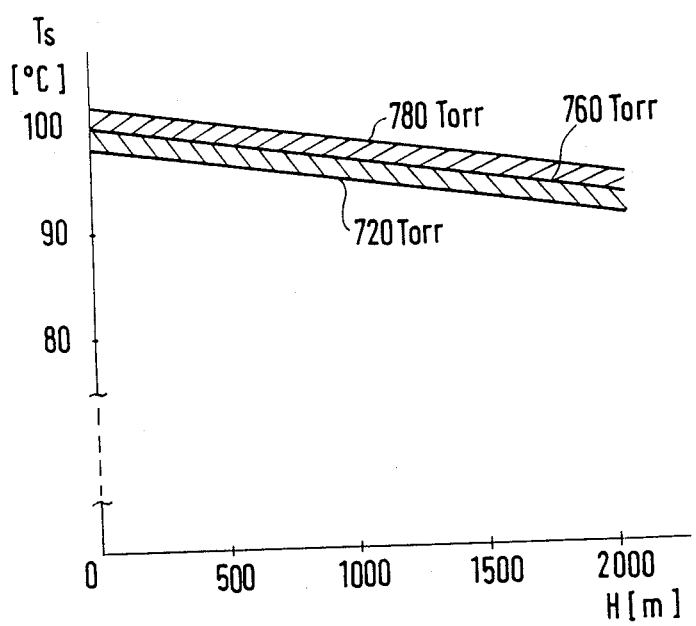
FIG. 2 illustrates how the boiling point Ts of water varies as a function of geographic altitude.

This dependence of the boiling point Ts of water on geographic altitude H is shown in FIG. 2, where the minimum range of variation (at any given altitude), causing changes in the boiling point of water amounting to about +/−2° C., is plotted for high pressure at 780 mm Hg and low pressure at 720 mm Hg. Changes as great as 2° in the boiling point of water at any given altitude are extremely rare. However, with each increase in geographic altitude H of about 210 m, the boiling point Ts of water drops about 1° C.

This range of variation is great enough in many cases such that if a processing or cooking temperature is selected just below (for example, 1° C. below) the boiling point of water, the boiling point may be exceeded unless there is an adjustment for variation of the boiling point as a function of the air pressure or geographic altitude.

Figure 3:
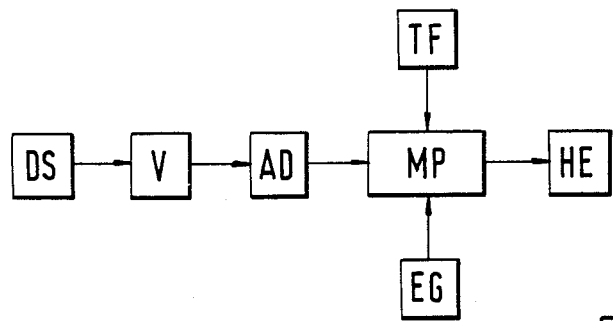
FIG. 3 is a schematic diagram of a device in accordance with this invention for automatic adjustment of the preselected processing or cooking temperature as a function of the prevailing atmospheric pressure.

As FIG. 3 illustrates, the heating power of the heating element HE can be regulated by a control circuit with a microprocessor MP. The heating element can be incorporated into a heating plate on which the cooking vessel is placed and by which it is heated, or can be incorporated in the cooking vessel itself. The exact placement of the heating element is not pertinent to the nature of this invention.

The control characteristics on which the actual temperature measured in the cooking vessel depends are preset in the microprocessor. The actual temperature is measured by means of temperature probe TF and transmitted to the microprocessor. The desired processing or cooking temperature is set by means of the input device EG.

The processing or cooking takes place in accordance with the control program in the microprocessor. Heating element HE is switched on and off periodically, and the "on" phases can vary from zero up a period of significant duration in order to permit variations in heating power. It is known to operate heating element HE at full heating power or at with reduced heating power in the "on" phases.

In the device according to this invention, all the control characteristics can still be performed as in the past. However, it is crucial that for processing and cooking temperatures near the boiling point of water, the preselected processing or cooking temperature be adjusted in order to compensate for changes in the boiling point of water which depend on the atmospheric pressure or the geographic altitude at the site of use of the cooking vessel.

In the practical embodiment shown in FIG. 3, a pressure sensor DS determines the prevailing atmospheric pressure D. The resultant analog measurement signal is amplified by amplifier V and converted by analog-digital converter AD to a digital measurement signal which is then sent to microprocessor MP. Microprocessor MP recognizes the value of atmospheric pressure D from the measurement signal and, thus, the corresponding boiling point Ts of water. The preset processing or cooking temperature is then reduced by microprocessor MP by a temperature amount which is calculated as the difference between the boiling point Ts at an atmospheric pressure of 760 mm Hg or 1013 hPa and the boiling point at the prevailing atmospheric pressure. Thus, the margin of safety from the boiling point of water remains constant regardless of the prevailing atmospheric pressure D.

If a cooking process is selected in which the processing or cooking temperature is just below the boiling point of water, this system assures that the processing or cooking temperature will automatically be reduced and regulated in such a way that the reduced boiling point of water at the prevailing atmospheric pressure will not be exceeded in the entire atmospheric pressure range. Furthermore, weather-induced changes and fluctuations in the boiling point Ts of water, as plotted in FIG. 2, are automatically accommodated by an appropriate reduction or increase in the preselected processing or cooking temperature.

Therefore, it is possible to keep a cooking process, for example, in a steam cooker, precisely below the boiling point of water and safely suppress the evolution of steam. In the microprocessor MP, the reduction in the preselected processing or cooking temperature which is necessary at the prevailing atmospheric pressure D is derived from the measurement signal of pressure sensor DS.

Figure 4:
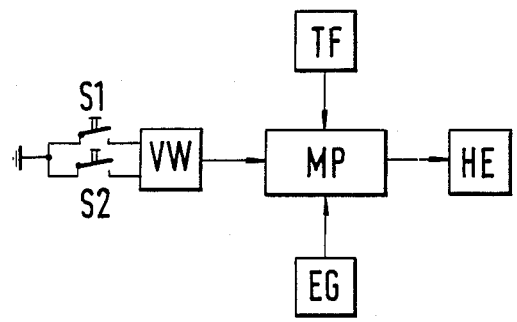
FIG. 4 is a schematic diagram of another embodiment of this invention, for manual adjustment of the preselected processing or cooking temperature as a function of four altitude ranges for the geographic altitude at the site of use.

The continuous adjustment of the cooking temperature to accommodate the changing boiling point of water in the practical embodiment of FIG. 3 can be simpified as in the embodiment according to FIG. 4. Microprocessor MP receives from the presetting device VW a signal which indicates to it the altitude range at the site of use. The geographic altitude H is divided into four ranges. The first range includes geographic altitudes of 0–300 m, and is followed by the ranges of 300–600 m, 600–900 m, with the last range being for altitudes H greater that 900 m. Each altitude range corresponds to a temperature reduction of about 1.5° C.

The microprocessor recognizes how much the given processing or cooking temperature should be reduced on the basis of the altitude range. In the first altitude range of 0–300 m, the reduction is 1.5° C., which increases by increments of 1.5° C. for each additional altitude range so that the processing or cooking temperature is reduced by a maximum of 6° C. when the site of use is at a geographic altitude of more that 900 m.

The two switches S1 and S2 are sufficient for a selection of four altitude ranges. With two switch positions of each of switches S1 and S2, it is possible to set four different switch states which cause microprocessor MP to recognize the given altitude range. Switches S1 and S2 on the device are set at the corresponding altitude range only once before initial operation of the device at the site of use. The switch mechanism can be covered with a safety cap.

While the principles of this invention have been described in connection with specific embodiments, it should be understood clearly that these descriptions are made only by way of example and are not intended to limit the scope of the invention.

We claim:

1. In a device for regulating the heating element of a cooking vessel of the type having an input device for preselecting a cooking temperature near the boiling point of water and control circuit means to maintain cooking temperature substantially constant at the preselected temperature, the improvement comprising means to sense atmospheric pressure independent of cooking-vessel pressure and means to modify the cooking temperature as a function of the sensed atmospheric pressure in accordance with the dependence of the boiling point of water on atmospheric pressure.

2. In a device for regulating the heating element of a cooking vessel of the type having an input device for preselecting a cooking temperature near the boiling point of water and control circuit means to maintain cooking temperature substantially constant at the preselected temperature, the improvement comprising:
the imput device is linked to the microprocessor;
the temperature-maintaining means includes a cooking-vessel temperature probe to determine and convey actual temperature to the microprocessor; and means to modify the cooking temperature as a function of the atmospheric pressure in accordance with the dependence of the boiling point of water on atmospheric pressure, said modifying means including an atmospheric pressure sensor and means for sending pressure information to the microprocessor,
whereby cooking temperature is automatically adjusted as a function of atmospheric pressure in accordance with the dependence of the boiling point of water on atmospheric pressure.

3. The device of claim 2 wherein the sending means is an analog-digital converter.

4. In a device for regulating the heating element of a cooking vessel of the type having an input device for preselecting a cooking temperature near the boiling point of water and control circuit means to maintain cooking termperature substantially constant at the preselected temperature, the improvement comprising:
the control circuit includes a microprocessor;
the input device is linked to the microprocessor; the temperature-maintaining means includes a cooking-vessel temperature probe to determine and convey actual temperature to the microprocessor; and means to modify the cooking temperature as a function of the atmospheric pressure in accordance with the dependence of the boiling point of water on atmospheric pressure, said modifying means including a manual presetting device linked to the microprocessor for sending thereto a signal corresponding to the altitude above sea level at the place of use,
whereby cooking temperature is automatically adjusted as a function of atmospheric pressure in accordance with the dependence of the boiling point of water on atmospheric pressure.

5. The device of claim 4 wherein the presetting device comprises switch means with settings corresponding to different altitudes.

6. The device of claim 5 wherein there are settings corresponding to different altitude ranges, each such range corresponding to a specific change in the boiling point of water.

7. The device of claim 6 wherein the settings are for 0–300 m, 300–600 m, 600–900 m, and greater than 900 m.

8. The device of claim 6 wherein the switoh means comprises two two-position switches, thereby accommodating four altitude ranges.

9. The device of claim 8 including means to cover the switches.

10. In a device for regulating the heating element of a cooking vessel of the type having an input device for preselecting a cooking temperature near the boiling point of water and control circuit means to maintain cooking temperature substantially constant at the preselected temperature, the improvement comprising means to modify the cooking temperature as a function of the atmospheric pressure in accordance with the dependence of the boiling point of water on atmospheric pressure, said modifying means including means to reduce the cooking temperature by 1° C. to compensate for a reduction in atmospheric pressure of about 20 mm Hg.

11. In a device for regulating the heating element of a cooking vessel of the type having an input device for preselecting a cooking temperature near the boiling point of water and control circuit means to maintain cooking temperature substantially constant at the preselected temperature, the improvement comprising means to modify the cooking temperature as a function of the atmospheric pressure in accordance with the dependence of the boiling point of water on atmospheric pressure, said modifying means including means to reduce the cooking temperature by 1° C. to compensate for an increase in altitude above sea level of about 210 m.

* * * * *

UNITED STATES PATENT AND TRADEMARK OFFICE
CERTIFICATE OF CORRECTION

PATENT NO. : 4,828,166
DATED : May 9, 1989
INVENTOR(S) : Kurt Wolf and Wolfram Andre It is certified that error appears in the above-identified patent and that said Letters Patent is hereby corrected as shown below:

On the title page, the name of the Assignee should be --Fissler GmbH--, rather than "Fissler BmbH".

In claim 2, the first subparagraph was entirely omitted. Therefore, the following should be inserted as an indented subparagraph beginning on line 7, that is, the line immediately after "comprising:": --the control circuit includes a microprocessor;--

In claim 2, line 7, "imput" should be --input--.

The subparagraphing of claim 2 is incorrect as printed. In claim 2, line 11, the words "means to modify" should start a new subparagraph, indented on the next line.

The subparagraphing of claim 4 is incorrect as printed. In claim 4, line 8, the words "the temperature-maintaining means" should start a new subparagraph, indented on the next line. In claim 4, line 12, the words "means to modify" should start a new subparagraph, indented on the next line.

In claim 8, line 1, "switoh" should be --switch--.

Signed and Sealed this

Twenty-first Day of August, 1990

*Attest:*

HARRY F. MANBECK, JR.

*Attesting Officer*   *Commissioner of Patents and Trademarks*